United States Patent [19]
Palan

[11] Patent Number: 5,851,083
[45] Date of Patent: Dec. 22, 1998

[54] MICROWAVE LEVEL GAUGE HAVING AN ADAPTER WITH A THERMAL BARRIER

[75] Inventor: Donald F. Palan, Chaska, Minn.

[73] Assignee: Rosemount Inc., Eden Prairie, Minn.

[21] Appl. No.: 726,145

[22] Filed: Oct. 4, 1996

[51] Int. Cl.⁶ .................................................... H01P 1/04
[52] U.S. Cl. ........................................... 403/337; 333/254
[58] Field of Search .................................. 285/41, 148.22, 285/148.23, 148.25, 148.28, 405, 363; 333/22 R, 254; 403/337; 165/183

[56] References Cited

U.S. PATENT DOCUMENTS

| | | |
|---|---|---|
| 982,463 | 1/1911 | Bennett ........................... 285/148.23 X |
| 2,409,599 | 10/1946 | Tiley ...................................... 333/22 R |
| 2,746,486 | 5/1956 | Gratzmuller ........................ 285/363 X |
| 2,786,185 | 3/1957 | Sege et al. . |
| 3,001,160 | 9/1961 | Trousdale . |
| 3,114,123 | 12/1963 | Kreuchen et al. . |
| 3,293,168 | 12/1966 | Schulz . |
| 3,421,781 | 1/1969 | Spurk ................................. 285/145.22 |
| 3,461,409 | 8/1969 | Miller ...................................... 333/254 |
| 3,594,667 | 7/1971 | Mann . |
| 3,818,383 | 6/1974 | Willis .................................. 333/254 X |
| 4,371,854 | 2/1983 | Cohn et al. . |
| 4,405,160 | 9/1983 | Tyuuman .............................. 285/41 X |
| 4,566,321 | 1/1986 | Zacchio . |
| 4,670,754 | 6/1987 | Zacchio . |
| 4,850,213 | 7/1989 | Steinebrunner et al. . |
| 5,002,123 | 3/1991 | Nelson et al. ........................... 165/147 |
| 5,051,715 | 9/1991 | Agosti et al. . |
| 5,115,218 | 5/1992 | Jean . |
| 5,262,743 | 11/1993 | Jean . |
| 5,305,237 | 4/1994 | Dalrymple et al. . |
| 5,495,218 | 2/1996 | Erb et al. . |
| 5,507,181 | 4/1996 | Fox et al. . |
| 5,594,449 | 1/1997 | Otto . |

FOREIGN PATENT DOCUMENTS

Wo 95/12113  5/1995  WIPO .

OTHER PUBLICATIONS

*Krohne Technical Data Brochure–BM 70*, "Level–Radar Non–contact level gauging using electromagnetic waves", Jan. 1992.
*Endress & Hauser Promotion–Sp003F/00/e*, "Guiding the Way through Micropilot Reliable level measurement–even under extreme process conditions", Nov. 1993.
*Endress & Hauser System Information SI 091F/24/ae*, "Microwave Level Measurement Micropilot Continuous level measurement in challenging conditions", Jan. 1996.
*TN Technologies Promotional Item*, "Measure Tech RCM", Jan. 1996.
*Cannon Bear Product Specifications*, "Cannon Bear® 1001 Microwave Level Transmitter", Form 3A:01C, Aug. 1989.
*Endress & Hauser Special Publication SP 001D/24/ae*, "Smart Radar Level Measurement Micropilot, Commonly Asked Questions About Microwave, Radar and Micropilot", Oct. 1996.
*Krohne Technical Data BM 70*, "Level–Radar non–contact level gauging using electromagnetic waves", Sep. 1995.

*Primary Examiner*—Anthony Knight
*Attorney, Agent, or Firm*—Westman, Champlin & Kelly, P.A.

[57] ABSTRACT

A microwave level gauge has a flange adaptor which includes a first end for coupling to a process connecting flange and a second end for coupling to an electronics housing. The adaptor has a section of reduced cross-sectional area along its length between the first and second ends, which defines a thermal transfer restriction that restricts heat transfer from the first end to the second end. A waveguide extends through the adaptor, from the first end to the second end.

22 Claims, 8 Drawing Sheets

MICROWAVE LEVEL GAUGE HAVING AN ADAPTER WITH A THERMAL BARRIER

BACKGROUND OF THE INVENTION

The present invention relates to a microwave level gauge adapter having a thermal barrier for use with a tank level sensor. The adapter serves as a structural mount between an electronics housing and the tank and serves as a pathway for transmitting microwave energy from the housing to an antenna in the tank.

Radar level gauges are in wide use for making non-contacting measurements of the level of products in tanks. Process fluids contained in tanks range from benign products to severely corrosive or abrasive compounds. Tank environments included a wide range of process pressures and temperatures, and conditions inside the tank are characterized by steam, smoke, dust, mist, foam, condensate, deposits, splashing and turbulence.

The occurrence of these operating conditions are important design considerations for microwave level instrumentation, especially since most level gauges sold on the market today are designed to use an antenna which protrudes into the tank. A typical level gauge includes an electronics housing, a process connecting flange and a housing to flange adapter. The antenna is mounted to the process connecting flange. Antenna and process connecting flange assemblies that are used have to be capable of containing the process pressures in the tanks in order to isolate the gauge electronics from the process vapors and liquids. It is important that the flange assembly contain process pressures both in terms of preventing damage to the gauge electronics and in terms of preserving the tank's ability to contain process pressures.

An additional design concern for the microwave level gauge is the problem of heat transfer from the process connecting flange and antenna, which may be at a very high temperature, to the gauge electronics within the electronics housing. Operating the gauge electronics at high temperatures caused by this heat transfer can cause the gauge electronics to suffer serious performance degradation, a shortened life cycle and eventual failure.

Meeting the design requirement of minimized heat transfer to the electronics while maintaining a microwave signal pathway, process seal and product safety certification requirements results in either a lower operating temperature specification for the microwave level gauge or a higher gauge cost through a combination of more difficult manufacturing processes, higher precision components and additional labor.

One existing solution to the heat transfer problem is to implement a technique that avoids placing temperature sensitive components and circuitry in the vicinity of the hot process connecting flange and antenna. The microwave level gauge is divided into two separate assemblies, one assembly for the antenna and microwave sensor and the other for the electronics. The antenna and microwave sensor assembly is a very low power device with relatively little self-heating. This assembly receives its power from and communicates with the electronics assembly which is typically mounted at the outside of the bottom of the tank. The electronics assembly has an explosion-proof and flame-proof housing. The electronics assembly contains the temperature sensitive and self-heating circuitry for power regulation, signal processing, communication, level (and volume) calculations and corrections, and locally displays tank information.

In implementing separate assemblies, most of the temperature sensitive components and circuits are isolated from the heat that is transferred from high process temperatures. Moreover, many of these components and circuits are themselves generators of heat during normal operation. Separating the assemblies allows a larger thermal budget inside the electronics housing since the only sources of heat are the ambient conditions around the electronics housing and the electronics themselves, not the process temperatures to which the device would be connected.

However, separating the assemblies does not eliminate heat transfer from the process to the critical microwave sensor mounted in the antenna and sensor assembly. The microwave sensor is highly temperature sensitive. In addition, the microwave sensor itself produces some heat during operation and is not well protected from the heat transfer produced by hot process conditions. Another disadvantage is extra cost. First, there are extra costs associated with two very large and heavy housing assemblies and an extra process seal required by the separation. Also contributing to these costs are extra terminations, covers, printed circuit boards, intrinsically safe electrical barriers, miscellaneous hardware, labor and overhead. Next, are the additional installation costs associated with extra mounting hardware, extra wiring and explosion proof conduits, extra explosion proof conduit seals and additional installation labor. Finally, there are extra costs associated with reliability, service and maintenance on two separate assemblies.

Another existing solution couples the electronics housing with the process connecting flange and antenna through a complex process seal system of stepped diameter mechanical barriers made of low dielectric materials placed in the waveguide. The barriers are mechanically held captive by the stainless steel components that form the walls of the waveguide. The components are machined to tight tolerances and are nearly pressed-fit as they are assembled. Several Orings in the assembly create process seals required at the various leakage paths. However, none of these paths are hermetically sealed through a joining process such as braising or soldering. The primary component which forms the junction between the electronics housing and the process connecting flange is a thick walled piece of stainless steel bolted between the connecting flange and an elongated neck at the base of the cast aluminum electronic housing. Although the overall arrangement is quite large, which helps to reduce heat transfer, it is complex, expensive and heavy, and there is a significant amount of heat that is still transferred from the process connecting flange and antenna to the electronics housing.

The need still exists for a low cost, effective, and high performance microwave level gauge having a flange adaptor that fulfills the microwave signal transmission requirements, acts as a process seal and provides a thermal barrier for heat transferred from the process connecting flange and antenna to the electronics housing.

SUMMARY OF THE INVENTION

The microwave level gauge adaptor of the present invention includes a first end for coupling to a process connecting flange and a second end for coupling to an electronics housing. The adaptor has a section of reduced cross-sectional area along its length between the first and second ends, which defines a thermal transfer restriction that restricts heat transfer from the first end to the second end. A waveguide extends through the adaptor, from the first end to the second end.

In one embodiment, the adaptor further includes a hub and a plurality of heat dissipating fins extending radially outward from the hub. The hub has an outer diameter which preferably increases from the thermal transfer restriction toward the second end. The heat dissipating fins are spaced about a circumference of the hub and extend in an axially direction parallel to the longitudinal axis of the hub. The surface area of the heat dissipating fins preferably increases from the thermal transfer restriction toward the second end.

In one embodiment, the plurality of heat dissipating fins define an outer diameter of the adaptor. The outer diameter decreases from the first end to the thermal transfer restriction and increases from the thermal transfer restriction toward the second end. In another embodiment, the outer diameter increases linearly from the first end to second end, with the thermal transfer restriction being positioned at the first end.

The adaptor can be mounted to the process connecting flange through a first adaptor plate positioned at the first end. The first adaptor plate has a plurality of axially aligned screw holes for mating with corresponding screw holes in the process connecting flange. In an alternative embodiment, the adaptor includes a threaded lug which extends in a axial direction from the first end for threading into the process connecting flange. In another embodiment, the adaptor includes a threaded bore extending within the adaptor in an axial direction from the first end for receiving a corresponding lug of the process connecting flange.

DETAILED DESCRIPTION OF THE PREFERRED EMBODIMENTS

Figure 1:
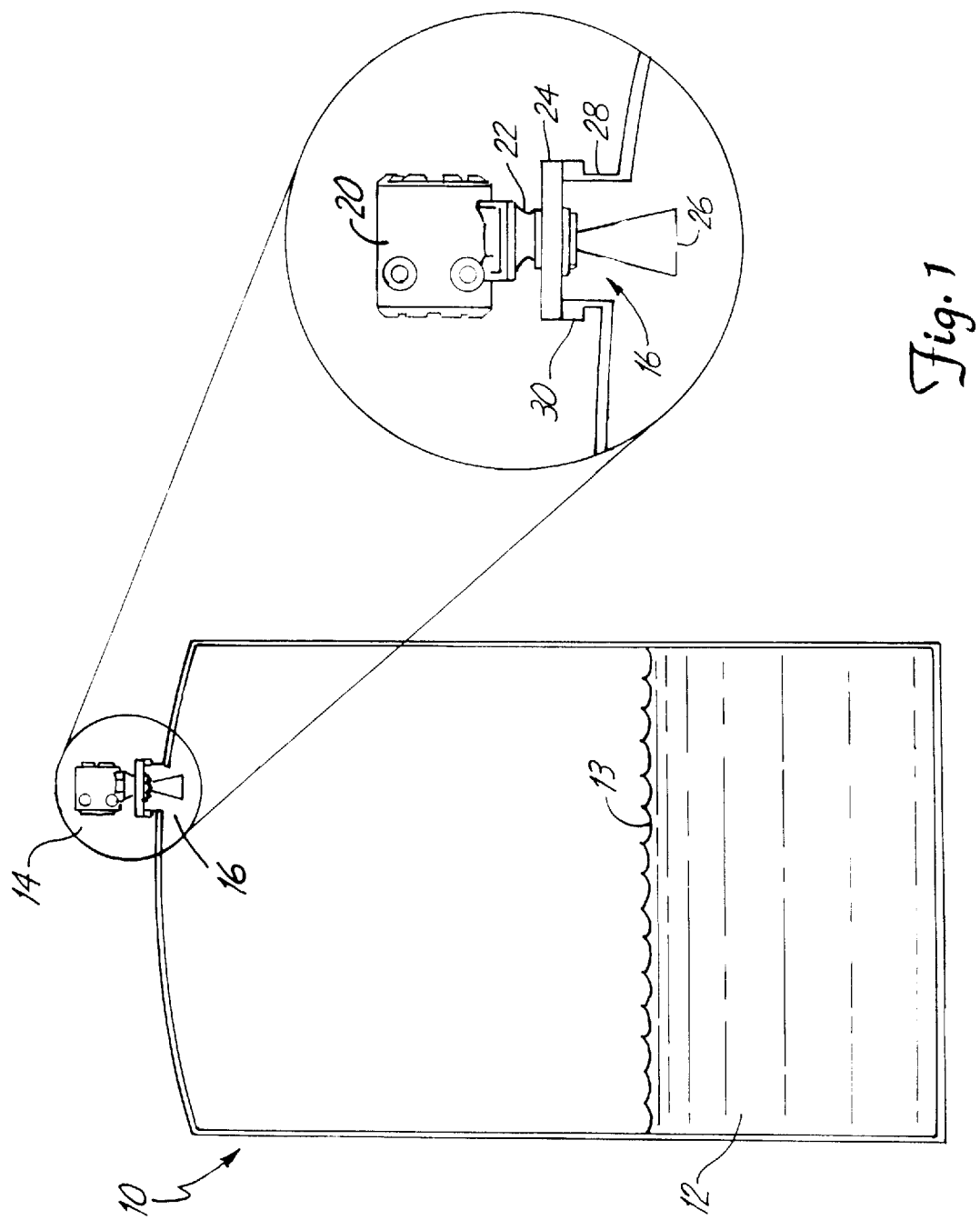
FIG. 1 is a schematic representation of a tank in which a microwave level gauge is installed according to the present invention.

FIG. 1 is a schematic representation of a process tank 10 in which a microwave level gauge assembly is installed according to the present invention. A process tank 10 is filled with a liquid 12, the height or level of which is to be determined by microwave level gauge assembly 14. The level gauge assembly 14 is mounted on a tank port 16 at the top of the tank, and is sealed relative to the tank. The microwave level gauge assembly 14 transmits microwave energy along a waveguide, through port 16 and receives reflected energy from the liquid surface 13 to provide an indication of the level of the liquid within the tank.

Microwave level gauge assembly 14 includes an electronics housing 20, a housing to flange adapter 22, a process connecting flange 24 and an antenna 26. Assembly 14 is mounted to a standoff pipe 28 which is fastened to the top of tank 10, around port 16. Tank flange 30 is fastened to standoff pipe 28. Process connecting flange 24 is secured with bolts to tank flange 30 and is sealed with a suitable gasket. Process connecting flange 24 supports both adapter 22 and electronics housing 20.

Figure 2:
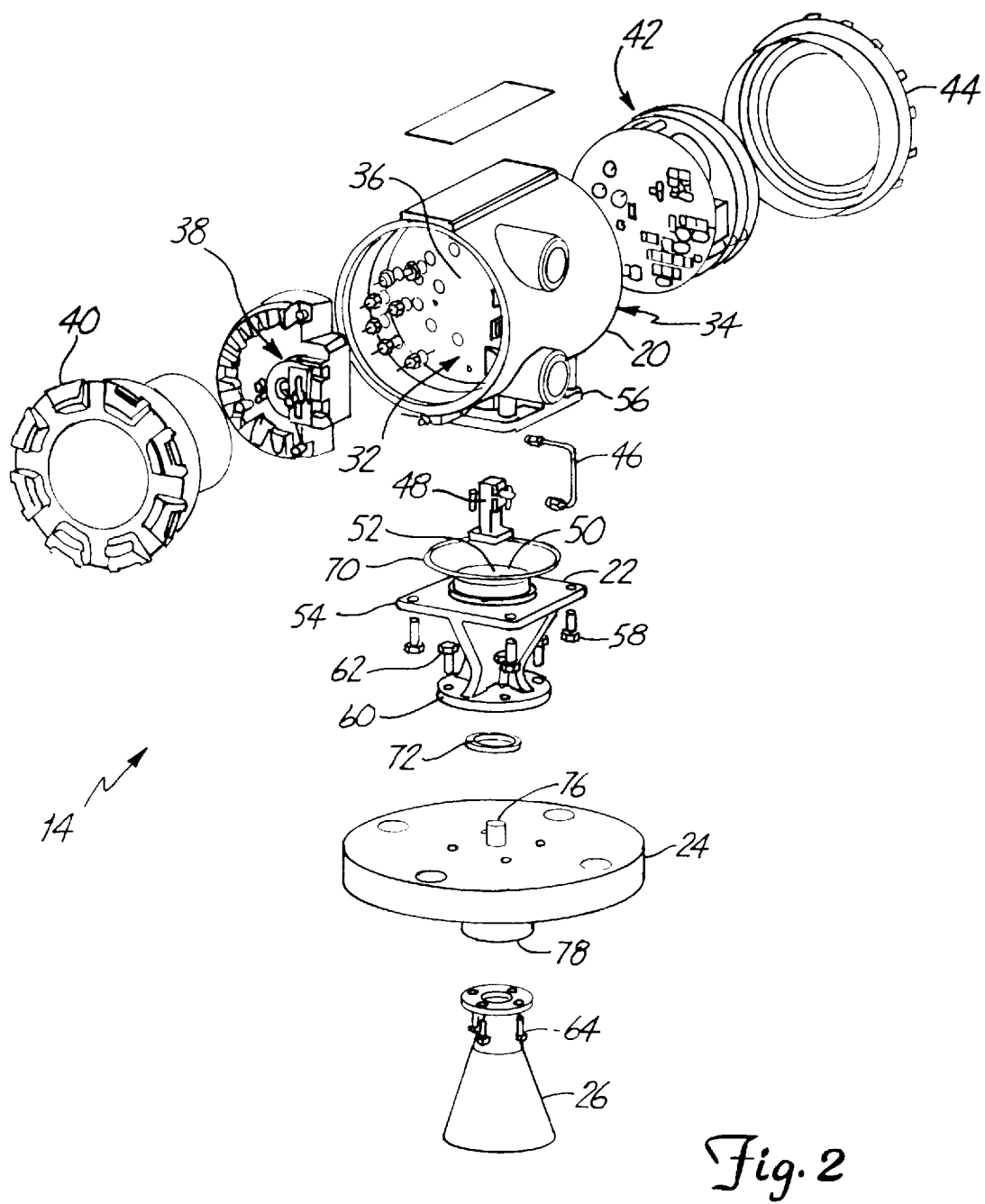
FIG. 2 is an exploded perspective view of the microwave level gauge shown in FIG. 1.

FIG. 2 is an exploded perspective view of level gauge assembly 14. Electronics housing 20 includes a terminal compartment 32 and an electronics compartment 34 which are separated by a barrier 36. A terminal block 38 is mounted within terminal compartment 32 for providing external electrical connections to the electronics within electronics compartment 34. The external electrical connections are used to couple assembly 14 to a process control link, such as a two or four wire process control loop or a process control bus, over which assembly 14 receives power and signal information and transmits level measurements and other status information. A cover 40 is threaded into terminal compartment 32 for sealing the terminal compartment with respect to the outside environment. The electronics that are used for transmitting microwave energy, receiving the reflections and for making sensor calculations are provided on a stack of printed circuit boards 42 which are mounted within electronics compartment 34. The electronics are well known in the industry. A cover 44 is threaded into electronics compartment 34 for sealing the electronics compartment with respect to the outside environment.

The electronics, comprised of the stack of printed circuit boards 42, provide microwave energy through a coaxial cable (coax) connection 46 which is coupled to a coaxial to rectangular waveguide adapter 48, positioned within electronics housing 20. The coax to rectangular waveguide adapter 48 is secured with screws to a raised boss 50 of housing to flange adapter 22. A waveguide aperture 52 extends through adapter 22 for transmitting the microwave energy to and from antenna 26. Adapter 22 includes a mounting plate 54, which is secured to a lower housing flange 56 of electronics housing 20 with bolts 58. Mounting plate 60 is secured to process mounting flange 24 with bolts 62. Antenna 26 is secured to a lower surface of process connecting flange 24 with bolts 64. Antenna 26 is of conventional design and includes a central aperture at an upper end that aligns with the waveguide aperture 52 in adaptor 22 and an aperture 76 through flange 24.

Figure 3:
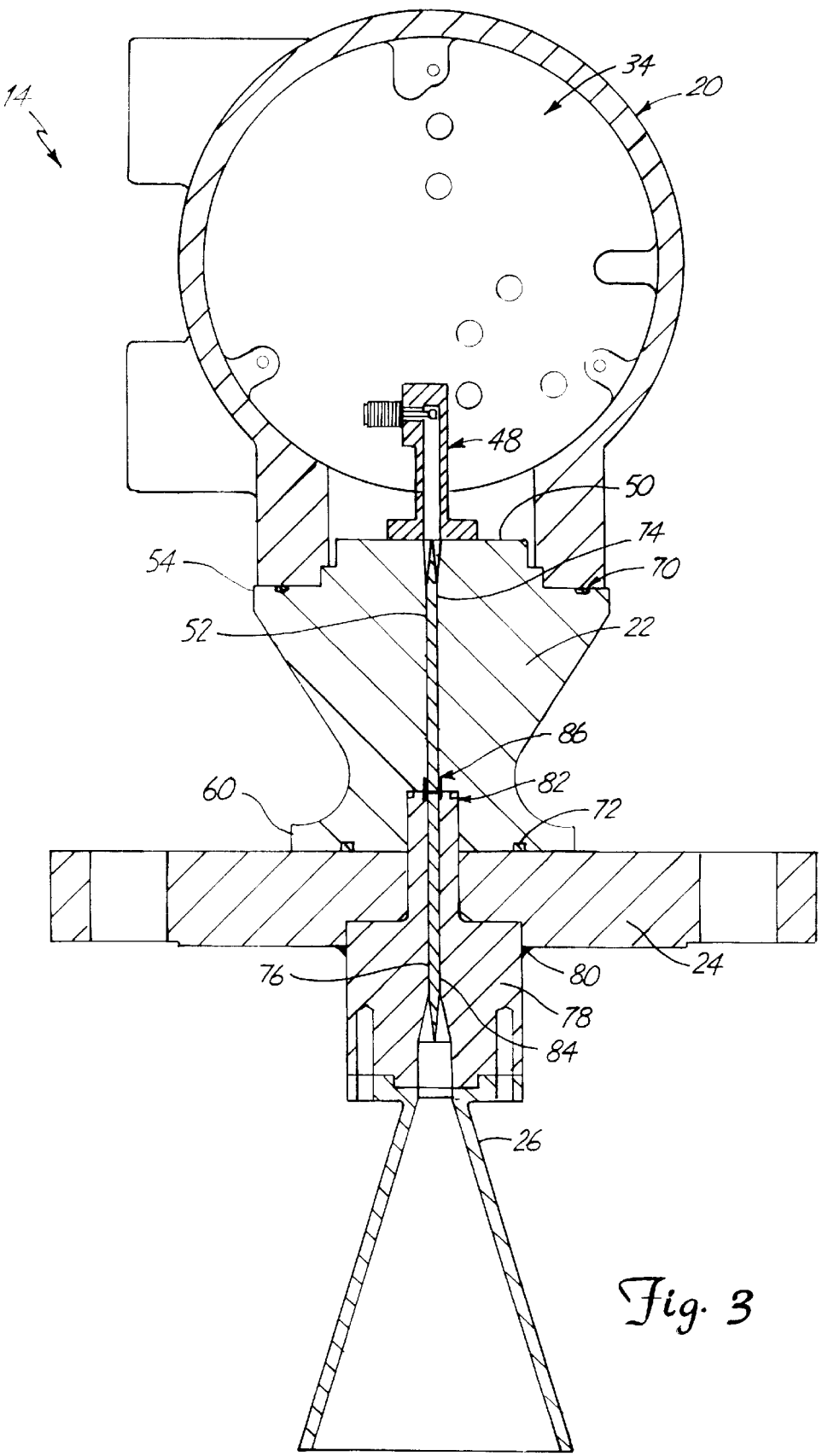
FIG. 3 is a cross-sectional view of the microwave level gauge in an assembled state.

FIG. 3 is a cross-sectional view of assembly 14 in an assembled state. As shown in FIG. 3, coax to rectangular waveguide adaptor 48 is mounted to boss 50 of adaptor 22 and extends within electronics compartment 34 of housing 20. Waveguide adapter 48 can include a variety of waveguides and, in one embodiment, includes an RA42-SMA-F-1A-A model waveguide which is available from Continental Microwave. An O-ring 70 sits within an annular recess in mounting plate 54 for sealing the adaptor plate to housing 20. Similarly, a high temperature gasket 72 sits within an annular recess in adaptor plate 60 for sealing the mounting plate to process connecting flange 24.

Aperture 52 extends along a longitudinal axis of adaptor 22 to form a waveguide for transmitting microwave energy through the adapter. A mechanical barrier 74 is positioned within aperture 52 which fills the waveguide for providing a process seal to insure that the process vapors, which are generally high temperature and highly corrosive, do not damage the electronics in electronics housing 20. The mechanical barrier that fills aperture 52 has a low dielectric constant over both the operating temperature and frequency ranges of the gauge and the barrier shape aids in impedance matching. The material of the barrier should be easy to machine or process, and should have good temperature and pressure performance. The material should be compatible with repeatable, easy to control joining processes between the barrier and the adaptor material through which the waveguide extends. Adaptor 22 is preferably formed of a material having poor thermal conductivity, strong structural characteristics and a high resistance to corrosion, such as stainless steel. Common materials used for the barrier include polytetrafluoroethylene, (such as Teflon), various thermal plastics, quartz and selected types of ceramic materials.

Aperture 52 is axially aligned with corresponding aperture 76 in a spool piece 78, which is welded to process connecting flange 24 at welds 80. The distal end of spool piece 78 carries an O-ring 82 for sealing with adaptor 22. A mechanical barrier 84 is positioned within aperture 76 and abuts mechanical barrier 74. Mechanical barriers 74 and 84 are brazed to adaptor 22 and spool piece 78, respectively, at area 86. In an alternative embodiment, mechanical barriers 74 and 84 are formed of a signal continuous piece of material.

In the embodiment shown in FIG. 3, antenna 26 includes a conically shaped antenna which is secured to spool piece 78. However, other antennas can also be used with the present invention, such as a "stick" antenna which includes a waveguide that extends into the tank.

Figure 4:
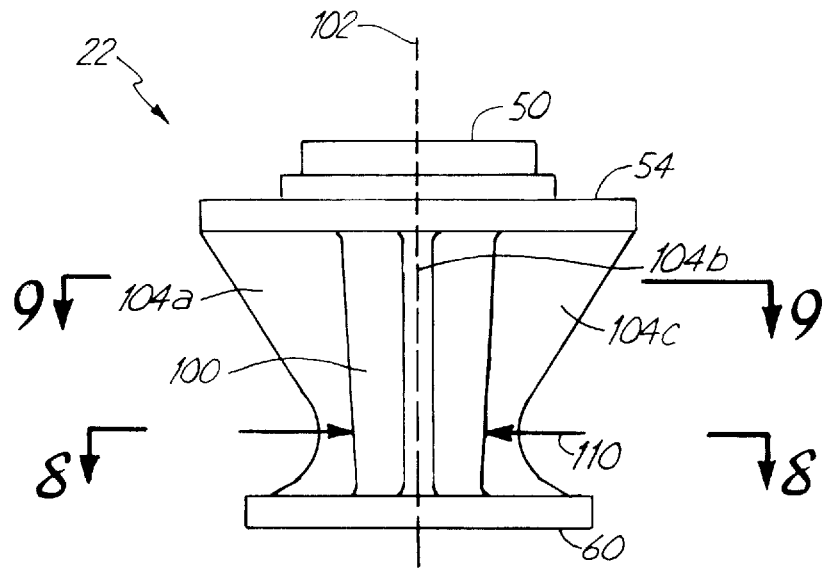
FIG. 4 is a side plan view of a housing to flange adaptor.

FIG. 4 is a side plan view of housing to flange adaptor 22. As described above, adaptor 22 includes raised boss 50, upper mounting plate 54 and lower mounting plate 60. Adaptor 22 further includes a hub 100 having a longitudinal axis 102. A plurality of heat dissipating fins 104a–14d (104d not shown) extend radially outward from hub 110. The heat dissipating fins 104a–14d are spaced about a circumference of hub 100 and extend in an axial direction parallel to longitudinal axis 102.

Figure 5:
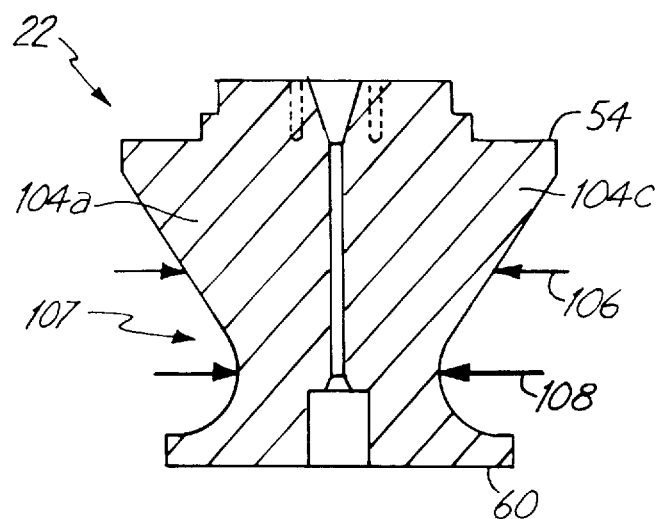
FIG. 5 is a cross-sectional view of the adaptor taken along a pair of heat dissipating fins.

FIG. 5 is a cross-sectional view of adapter 22 taken along fins 104a and 104c. Heat dissipating fins 104a–14d (fins 104B and 104D not shown in FIG. 5) define an outer diameter 106 of the adaptor 22 which decreases from mounting plate 60 to a minimum diameter 108 and increases from minimum diameter 108 toward upper mounting plate 54. Minimum diameter 108 provides a section of reduced cross-sectional area along the axis 102 (shown in FIG. 4) of adapter 22, between lower mounting plate 60 and upper mounting plate 54. This section of reduced cross-sectional area defines a thermal transfer restriction 107 that restricts heat transfer from plate 60 to plate 54.

In addition, heat dissipating fins 104a–104d have a surface area which increases from thermal transfer restriction 107 toward upper mounting plate 54. Also, hub 100 has an outer diameter 110 (shown in FIG. 4) which increases from lower mounting plate 60 to upper mounting plate 54. This further constricts the cross-sectional area of adapter 22 at thermal transfer restriction 107. In the embodiments shown in FIGS. 4 and 5, the outer edges of heat dissipating fins 104a–104d neck down in a curved fashion along outer diameter 106 through thermal transfer restriction 107. This curved shape minimizes stress concentration along the fins due to mechanical forces, which increases the structural integrity of adapter 22.

The increasing surface area of heat dissipating fins 104a–104d distributes and disperses the small amount of heat that is transferred through adaptor 22. Another factor which contributes to reducing heat transfer from process connecting flange 24 to electronics housing 20 through adaptor 22 is the use of materials that are poor conductors of heat, such as stainless steel. The increasing size of heat dissipating fins 104a–104d also increases the support for the electronics housing.

An additional benefit to adaptor 22 is that it allows for greater variation in the selection of flange sizes that can be used with the level gauge assembly. For example, lower mounting plate 60 forms a small mounting flange, but provides a large amount of clearance between the flange and the electronics housing so that a smaller process mounting flange, such as 2 inch ANSI 150# flange (or comparable DIN or JIS flange) can be used and still provide enough clearance for the bolts required to mount the gauge to the tank.

Figure 6:
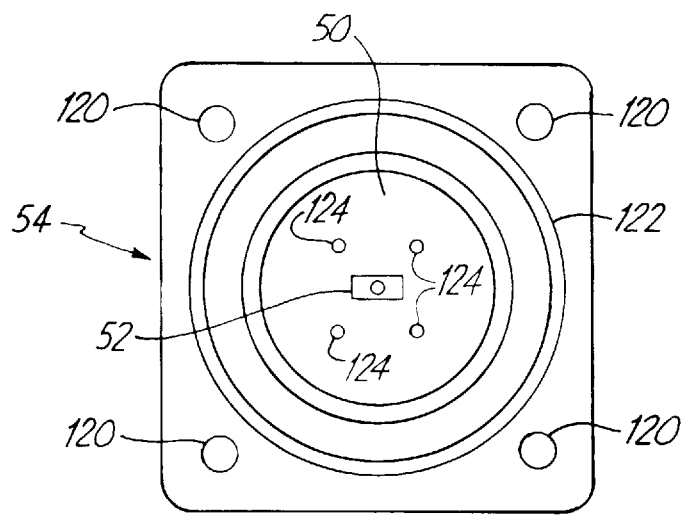
FIG. 6 is a top plan view of an adaptor.

FIG. 6 is top plan view of upper mounting plate 54. Plate 54 includes raised boss 50, screw holes 120, aperture 52, annular recess 122, and threaded bores 124. Annular recess 122 receives O-ring 70 (shown in FIGS. 2 and 3). Threaded bores 124 receive corresponding screws for attaching coax to rectangular waveguide adaptor 48 to raised boss 50.

Figure 7:
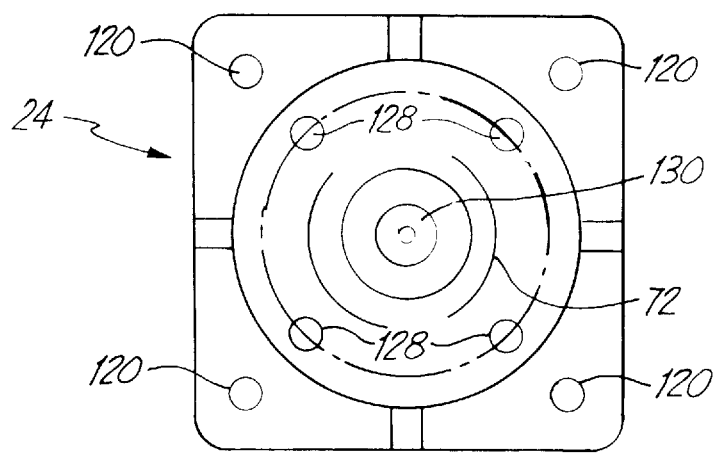
FIG. 7 is a bottom plan view of a adaptor.

FIG. 7 is bottom plan view of lower mounting plate 60. Mounting plate 60 includes screw holes 128 for attaching to flange 24 which attaches to tank flange 30 (shown in FIG. 1) plate 60 further includes gasket 72 and an aperture 130 for receiving spool piece 78 (shown in FIG. 3).

Figure 8:
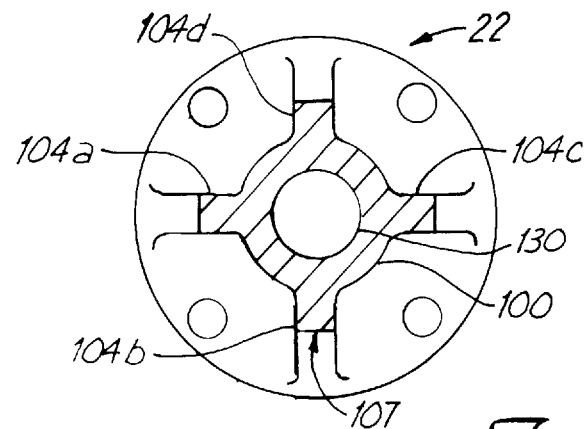
FIG. 8 is a cross-sectional view of the adapter taken along lines 8—8 of FIG. 4.
Figure 9:
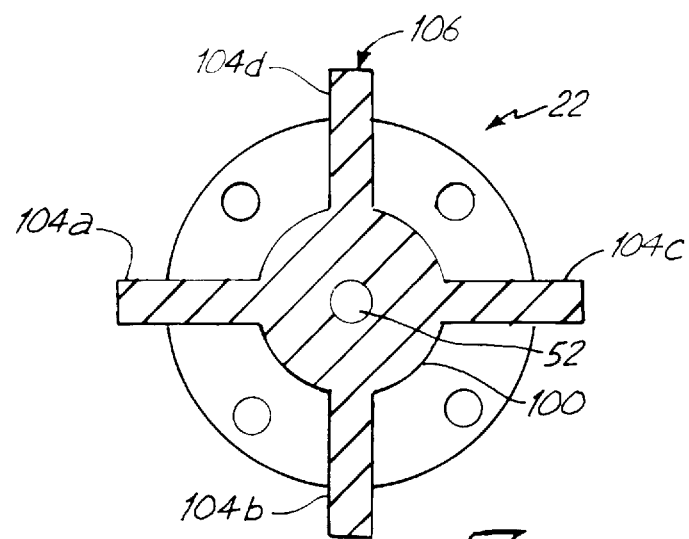
FIG. 9 is cross-sectional view of the adapter taken along lines 9—9 of FIG. 4.

FIG. 8 is cross-sectional view of adapter 22 taken along lines 8—8 of FIG. 4. FIG. 9 is cross-sectional view of adapter 22 taken along lines 9—9 of FIG. 4. Hub 100 has a slightly smaller outer diameter at section 8—8 than at section 9—9. This further decreases the cross-sectional area of adapter 22 at thermal transfer restriction 107. As seen in FIG. 9, the cross-sectional area of adapter 22 increases as the adapter is traversed upwardly along its longitudinal axis. This increases heat dissipation as the heat travels from the process connecting flange toward the electronics housing.

Figure 10:
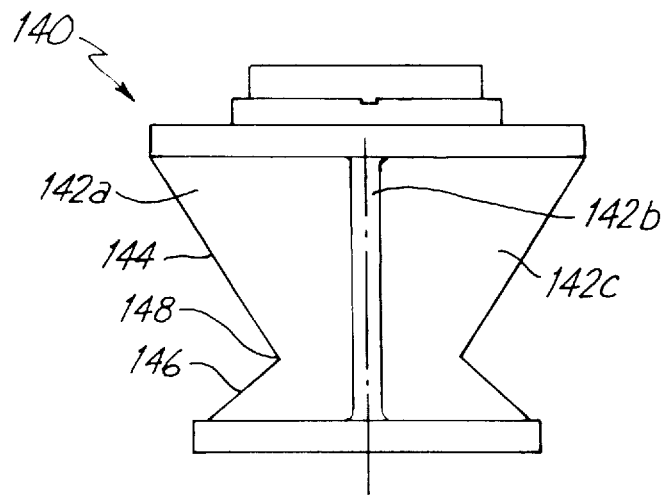
FIG. 10 is a side plan view of an adaptor according to an alternative embodiment of the present invention.

FIG. 10 is a side plan view of an adaptor 140 according to an alternative embodiment of the present invention. Adapter 140 has heat dissipating fins 142a–142d (142d not shown) having outer edges which are formed of two intersecting line segments 144 and 146. Line segments 144 and 146 intersect at intersection 148.

Figure 11:
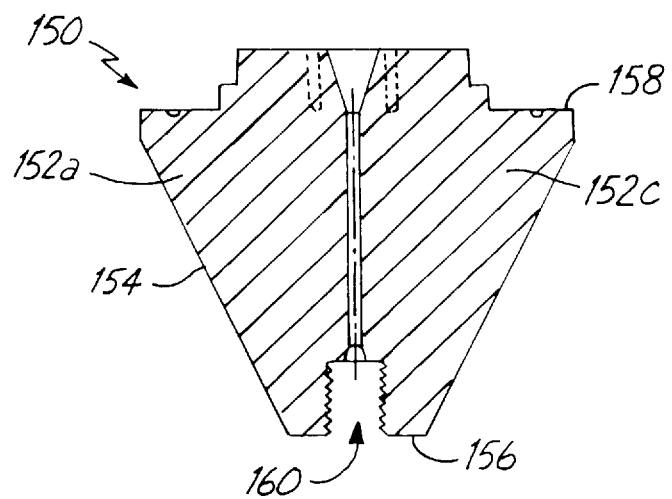
FIG. 11 is a cross-sectional view of an adaptor according to another alternative embodiment of the present invention.

FIG. 11 is a cross-sectional view of an adaptor 150 according to another alternative embodiment of the present invention. The cross-section of FIG. 11 is similar to the cross-section shown in FIG. 5. Heat dissipating fins 152a and 152c have an outer edge 154 that defines an outer diameter of adapter 150. In this embodiment. The outer diameter increases linearly from lower flange mounting end 156 toward upper mounting plate 158. In addition, adapter 150 has an alternative lower mounting end 156. Instead of a lower mounting plate, adapter 150 has a threaded bore 160 for receiving a corresponding lug from a respective process mounting plate.

Figure 12:
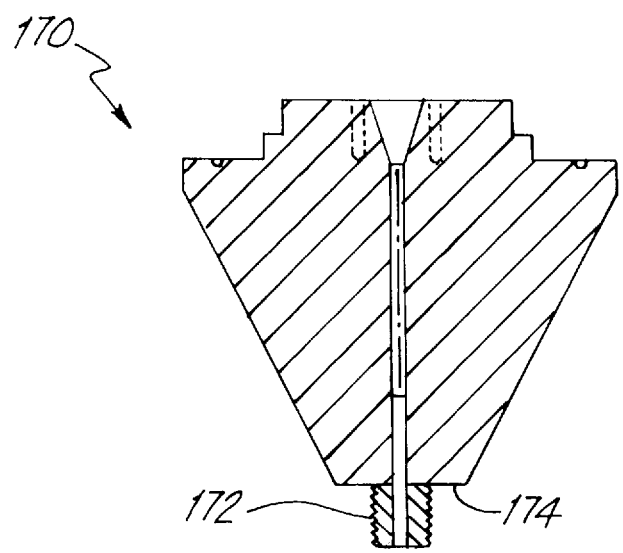
FIG. 12 is a cross-sectional view of an adapter according to another alternative embodiment of the present invention.

FIG. 12 is cross-sectional view of adapter 170 according to another alternative embodiment of the present invention. Adaptor 170 is similar to adaptor 150 shown in FIG. 11, but includes a threaded lug 172 which extends axially from lower mounting end 174. The respective process connecting flange is provided with a threaded bore which mates with threaded lug 172 for mounting adapter 170 to the flange.

The housing to flange adapter of the present invention has a material and a geometry that are selected to act as a "thermal dam" to minimize heat transfer from the process connecting flange and antenna to the electronics housing. There are two main advances in technology that have given rise to the ability to provide the heat transfer solution of the present invention. First, microwave electronics are now capable of operating at 24 GHz, which is more than twice as high as the operating frequencies of most recent microwave level gauges. This greatly reduces the required cross-sectional area of the waveguide for microwave propagation and in general allows for a reduction in the size of the gauge. Second, recent advancements in thermoplastics and ceramics have greatly increased the availability and quality of high temperature, low dielectric, low loss tangent materials which are used in the construction of mechanical barriers and process seals. As a result, level gauges using these techniques can operate in contact with higher temperature process conditions.

With higher accuracy and smaller geometries, thermal effects become more problematic since the microwave signals and their surrounding structure and circuitry are much more susceptible to temperature effects and noise. The housing to flange adapter of the present invention maximizes the signal to noise ratio by minimizing noise components due to thermal effects.

The present invention provides for a method of minimizing heat transfer from the process connecting flange to the electronics housing in which thermal conductivity is restricted through a section of the adapter by reducing the cross-sectional area of the adapter, and heat dissipation is increased by increasing the surface area of the adapter as the adapter is traversed toward the electronics housing.

Although the present invention has been described with reference to preferred embodiments, workers skilled in the art will recognize that changes may be made in form and detail without departing from the spirit and scope of the invention.

What is claimed is:

1. A microwave level gauge adapter for coupling between an electronics housing and a process connecting flange, the adapter comprising:
   a first, process connecting end for coupling to the process connecting flange and a second, electronics connecting end for coupling to the electronics housing;
   a length from the first end to the second end;
   a hub;
   a section of reduced cross-sectional area along the length of the adapter between the first and second ends, which defines a thermal transfer restriction that restricts heat transfer from the first end to the second end;
   a plurality of heat dissipating fins extending radially outward from the hub and having a surface area which increases from the thermal transfer restriction toward the second end; and
   a waveguide extending through the hub, from the first end to the second end.

2. The microwave level gauge adapter of claim 1 wherein:
   the cross-sectional area of the adapter progressively increases from the thermal transfer restriction to the second end.

3. The microwave level gauge adapter of claim 1 wherein the hub has a side wall with a thickness that progressively increases from the thermal transfer restriction toward the second end.

4. The microwave level gauge adapter of claim 1 wherein the plurality of heat dissipating fins are spaced about a circumference of the hub and extend in an axial direction parallel to a longitudinal axis of the hub.

5. The microwave level gauge adapter of claim 1 wherein the plurality of heat dissipating fins define an outer diameter of the adapter and wherein the outer diameter decreases from the first end to the thermal transfer restriction and increases from the thermal transfer restriction toward the second end.

6. The microwave level gauge adapter of claim 1 wherein the plurality of heat dissipating fins define an outer diameter of the adapter and wherein the outer diameter increases linearly from the first end to the second end, with the thermal transfer restriction being positioned at the first end.

7. The microwave level gauge adapter of claim 1 wherein the hub has an outer diameter which increases from the thermal transfer restriction toward the second end.

8. The microwave level gauge adapter of claim 1 and further comprising:
   a first mounting plate at the first end having a plurality of axial screw holes for mating with corresponding screw holes in the process connecting flange; and
   a second mounting plate at the second end having a plurality of axial screw holes for mating with corresponding screw holes in the electronics housing.

9. The microwave level gauge adapter of claim 1 and further comprising:
   a threaded lug extending in an axial direction from the first end for threading into the process connecting flange.

10. The microwave level gauge adapter of claim 1 and further comprising:
    a threaded bore extending within the adapter in an axial direction from the first end for receiving a corresponding lug of the process connecting flange.

11. A microwave level gauge adapter for coupling between an electronics housing and a process connecting flange, the adapter comprising:
    a hub having a first end for coupling to the process connecting flange and a second end for coupling to the electronics housing;
    a plurality of heat dissipating fins extending radially outward from the hub, wherein the plurality of heat dissipating fins define an outer diameter of the adapter;
    a section of reduced cross-sectional area along the hub which defines a thermal transfer restriction that restricts heat transfer from the first end to the second end, wherein the outer diameter decreases from the first end to the thermal transfer restriction and increases from the thermal transfer restriction toward the second end; and
    a waveguide extending through the hub from the first end to the second end.

12. The microwave level gauge adapter of claim 11 wherein:
    the hub has a cross-sectional area which progressively increases from the first end to the second end.

13. The microwave level gauge adapter of claim 11 wherein:
    the hub has a wall thickness and an outer diameter which progressively increase from the first end to the second end.

14. The microwave level gauge adapter of claim 11 wherein the plurality of heat dissipating fins are spaced about a circumference of the hub and extend in an axial direction parallel to a longitudinal axis of the hub.

15. The microwave level gauge adapter of claim 11 wherein the plurality of heat dissipating fins have a surface area which increases from the thermal transfer restriction toward the second end.

16. The microwave level gauge adapter of claim 11 and further comprising:

a first mounting plate at the first end having a plurality of axial screw holes for mating with corresponding screw holes in the process connecting flange; and a second mounting plate at the second end having a plurality of axial screw holes for mating with corresponding screw holes in the electronics housing.

17. The microwave level gauge adapter of claim 11 and further comprising:

a threaded lug extending in an axial direction from the first end for threading into the process connecting flange.

18. The microwave level gauge adapter of claim 11 and further comprising:

a threaded bore extending within the adapter in an axial direction from the first end for receiving a corresponding lug of the process mounting flange.

19. A process transmitter in a process control system, comprising:

a transmitter housing;

a process connecting flange connectable to the process; and an adapter coupled between the transmitter housing and the process connecting flange, the adapter having a hub with a thermal restriction and a plurality of heat dissipating fins having a cross-sectional area which reduces from the process connecting flange to the thermal transfer restriction and increases from the thermal transfer restriction toward the transmitter housing.

20. The process transmitter of claim 19 wherein the plurality of heat dissipating fins has a surface area which progressively increases from the thermal restriction toward the transmitter housing.

21. The process transmitter of claim 19 and further comprising a waveguide which extends through the hub from the process connecting flange toward the transmitter housing and has a section with a constant waveguide diameter, and wherein the hub has a wall thickness which progressively increases along the section in a direction from the thermal restriction toward the electronics housing.

22. A method of minimizing heat transfer between a process connecting flange and an electronics housing of a microwave level gauge which is coupled to the flange through an adapter, wherein the adapter has a waveguide, a wall thickness along the waveguide, and a plurality of heat dissipating fins, the method comprising:

restricting thermal conductivity through a section of the adapter by reducing the cross-sectional area of the section; and increasing heat dissipation of the adapter by increasing the wall thickness of the adapter and by increasing the surface area and cross-sectional area of the heat dissipating fins as the adapter is traversed from the section to the electronics housing.

* * * * *